US008881253B2

(12) United States Patent
Satish et al.

(10) Patent No.: US 8,881,253 B2
(45) Date of Patent: Nov. 4, 2014

(54) METHOD AND APPARATUS FOR ACCEPTING A DIGITAL IDENTITY OF A USER BASED ON TRANSITIVE TRUST AMONG PARTIES

(75) Inventors: Sourabh Satish, Fremont, CA (US); Brian Hernacki, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 1616 days.

(21) Appl. No.: 11/729,381

(22) Filed: Mar. 28, 2007

(65) Prior Publication Data

US 2008/0244722 A1    Oct. 2, 2008

(51) Int. Cl.
*H04L 29/06* (2006.01)
*G06F 21/33* (2013.01)

(52) U.S. Cl.
CPC .................................. *G06F 21/33* (2013.01)
USPC .............................................. 726/9; 713/185

(58) Field of Classification Search
USPC .............................................. 713/185; 726/9
See application file for complete search history.

(56) References Cited

U.S. PATENT DOCUMENTS

| 2004/0162786 A1* | 8/2004 | Cross et al. ..................... 705/59 |
| 2007/0204168 A1* | 8/2007 | Cameron et al. ............... 713/185 |
| 2008/0028215 A1* | 1/2008 | Nanda et al. ................... 713/168 |
| 2008/0209218 A1* | 8/2008 | Rowley ........................... 713/176 |

FOREIGN PATENT DOCUMENTS

GB    2357228 A    6/2001

OTHER PUBLICATIONS

Abdul-Rahman, Alfarez. "The pgp trust model." EDI-Forum: the Journal of Electronic Commerce. vol. 10. No. 3. 1997.*
Oppliger, Rolf, Sebastian Gajek, and Ralf Hauser. "Security of microsoft's identity metasystem and cardspace." Communication in Distributed Systems (KiVS), 2007 ITG-GI Conference. VDE, Feb. 26-Mar. 2, 2007.*
UK Intellectual Property Office Search Report dated Jun. 17, 2008 for Application No. GB0804241.8.
Abdul-Rahman, Alfarez, "The PGP Trust Model," EDI-Forum: The Journal of Commerce, Apr. 1997, downloaded from http://www.wim.uni-koeln.de/uploads/media/The_PGP_Trust_Model.pdf on Jun. 17, 2008.
Yesberg, John D. and Anderson, Mark S., "Quantitative authentication and vouching," Computers & Security, vol. 15, No. 7, pp. 633-645, 1996.

* cited by examiner

*Primary Examiner* — Vikkram Bali
*Assistant Examiner* — Tracy Mangialaschi
(74) *Attorney, Agent, or Firm* — Wilmer Cutler Pickering Hale and Dorr LLP

(57) ABSTRACT

Method and apparatus for accepting a digital identity of a user based on transitive trust among parties are described. One aspect of the invention relates to managing a digital identity of a user. The digital identity is provided to a first party, where the digital identity includes a self-asserted claim. An acceptance token is obtained from the first party. The acceptance token purports authenticity of the self-asserted claim according to the first party. The digital identity and the acceptance token are provided to a second party to request validation of the self-asserted claim by the second party based on the acceptance token.

15 Claims, 3 Drawing Sheets

METHOD AND APPARATUS FOR ACCEPTING A DIGITAL IDENTITY OF A USER BASED ON TRANSITIVE TRUST AMONG PARTIES

BACKGROUND OF THE INVENTION

1. Field of the Invention

Embodiments of the invention generally relate to digital identity management. More specifically, this disclosure relates to a method and apparatus for accepting a digital identity of a user based on transitive trust among parties.

2. Description of the Related Art

In a computer network, such as the Internet, users typically transmit personal and confidential information at the behest of a particular application or service. In some cases, such confidential information may be stored by a remote host for later access by the users. The applications typically authenticate the users prior to accepting the confidential information or allowing access to such information. One well-known scenario for authentication involves the transmission of a username and password over the network to an application, such as web site on the Internet. Another recent, more secure mechanism for authentication involves the use of a digital identity. When transmitted over a network, a digital identity is represented by a security token (also referred to as a token). A token includes one or more claims, each of which includes some part of the total information conveyed by the digital identity. For example, a token may include claims for a username, a password, credit card numbers, and/or a myriad of other types of information.

Some digital identity management systems provide for two types of digital identities: self-asserted identities and managed identities. To distinguish between the two types of identities, it is useful to define three distinct roles. A user is the entity that is associated with the digital identity. An identity provider is an entity that provides a digital identity for a user. A relying party is an entity that in some way relies on the digital identity. For example, the relying party may use the digital identity to authenticate the user. A self-asserted identity is one where the user and the identity provider are one and the same. For example, if a user is creating an account at an online provider, such as AMAZON.COM, than the user is creating his or her own identity (e.g., a username and password). A managed identity is a stronger form of digital identity in that the information is backed by a third party and hence is assumed to be more trustworthy. That is, an identity provider external to the user provides the digital identity to the user.

For a self-asserted identity, a relying party must use its own processes to validate the user and his or her self-asserted claims and thus the relying party incurs the cost of validation. For a managed identity, the user is typically required to pay direct or indirect fees for obtaining the identity from an identity provider. In addition, the relying party must know the identity provider and be aware of the identity provider's policies before accepting a managed identity issued to the user. If not the user, the relying party is typically required to pay the identity provider for using its issued identities. Accordingly, there exists a need in the art for an identity management mechanism that reduces or eliminates the costs associated with the establishment and use of digital identities across users, relying parties, and identity providers.

SUMMARY OF THE INVENTION

Method and apparatus for accepting a digital identity of a user based on transitive trust among parties are described. One aspect of the invention relates to managing a digital identity of a user. The digital identity is provided to a first party, where the digital identity includes a self-asserted claim. An acceptance token is obtained from the first party. The acceptance token purports authenticity of the self-asserted claim according to the first party. The digital identity and the acceptance token are provided to a second party to request validation of the self-asserted claim by the second party based on the acceptance token.

In another example, a digital identity is provided from a computer to a first party, where the digital identity includes a self-asserted claim. The self-asserted claim is validated at the first party. An acceptance token is sent from the first party to the computer. The acceptance token purports authenticity of the self-asserted claim according to the first party. The digital identity and the acceptance token are provided from the computer to a second party. The self-asserted claim is validated at the second party based on the acceptance token and a transitive trust established between the first party and the second party.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
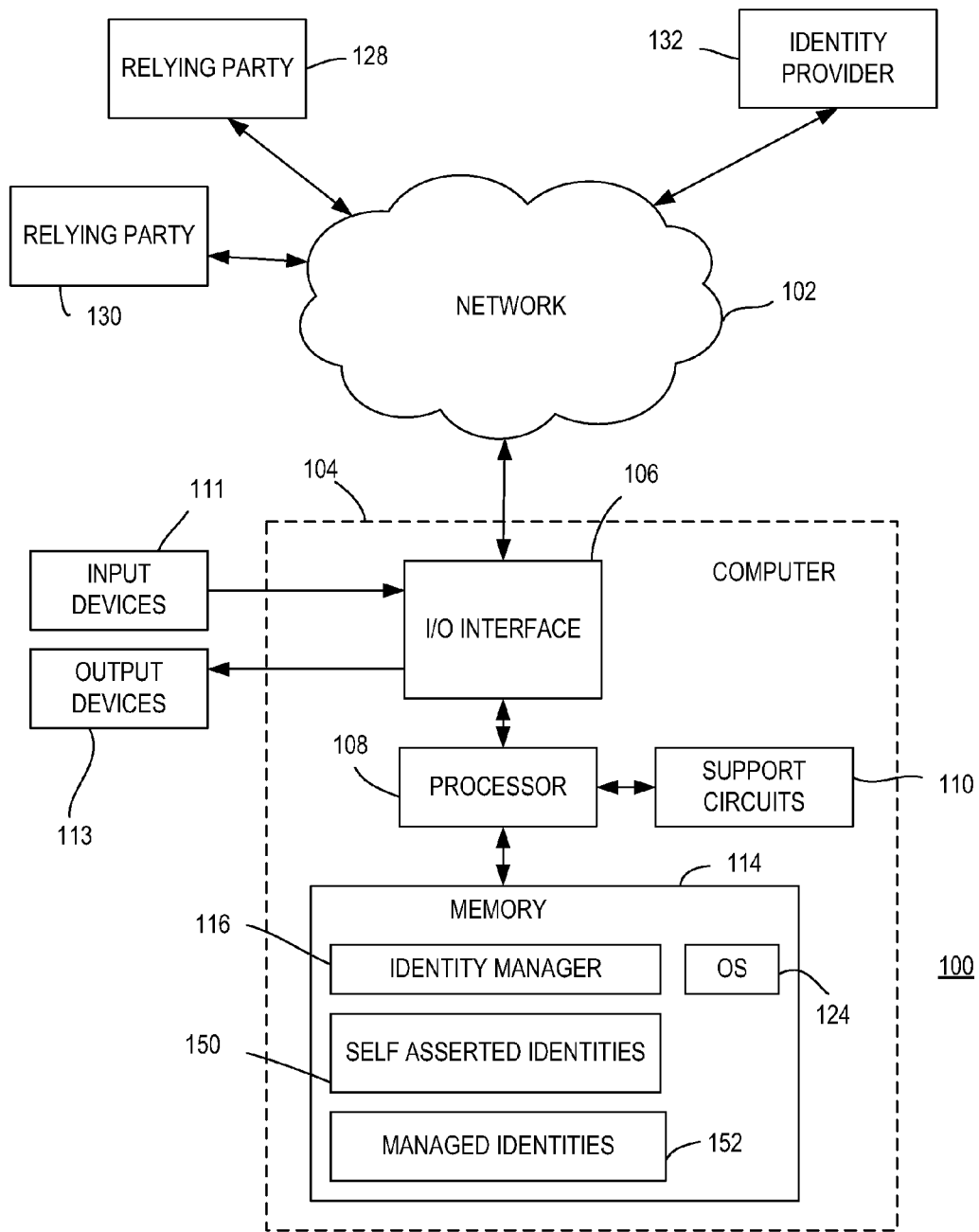
FIG. 1 is a block diagram depicting an exemplary embodiment of a networked computer system in accordance with one or more aspects of the invention.

FIG. 1 is a block diagram depicting an exemplary embodiment of a networked computer system 100 in accordance with one or more aspects of the invention. The system 100 includes a network 102 coupled to a computer 104. The computer 104 illustratively includes a processor 108, a memory 114, various support circuits 110, an I/O interface 106. The processor 108 may include one or more microprocessors known in the art. The support circuits 110 for the processor 108 include conventional cache, power supplies, clock circuits, data registers, I/O interfaces, and the like. The I/O interface 106 may be directly coupled to the memory 114 or coupled through the processor 108. The I/O interface 106 may also be configured for communication with input devices 111 and/or output devices 113, such as, network devices, various storage devices, mouse, keyboard, display, and the like. The I/O interface 106 is also coupled to the network 102. The network 102 comprises a communication system that connects computer systems by wire, cable, fiber optic, and/or wireless links facilitated by various types of well-known network elements, such as hubs, switches, routers, and the like. The network 102 may employ various well-known protocols to communicate information. For example, the network 102 may be part of the Internet.

The memory 114 stores processor-executable instructions and/or data that may be executed by and/or used by the processor 108. These processor-executable instructions may comprise hardware, firmware, software, and the like, or some combination thereof. Modules having processor-executable instructions that are stored in the memory 114 may include an identity manager 116. The computer 104 may be programmed with an operating system 124, which may include OS/2, Java Virtual Machine, Linux, Solaris, Unix, HPUX, AIX, Windows, Windows95, Windows98, Windows NT, and Windows2000, WindowsME, WindowsXP, Windows Server, among other known platforms. At least a portion of the operating system 124 may be disposed in the memory 114. The memory 114 may include one or more of the following random access memory, read only memory, magneto-resistive read/write memory, optical read/write memory, cache memory, magnetic read/write memory, and the like, as well as signal-bearing media as described below.

The identity manager 116 is configured to manage digital identities for one or more users of the computer 104. In general, a digital identity is represented by a security token (token) having one or more claims, each of which includes some part of the total information conveyed by the digital identity. A digital identity may be as simple as an e-mail address, or include more information, such as a username, a password, credit card numbers, social security number, and/or a myriad of other types of information. The tokens may be in a variety of well-known formats, including X.509 certificates, Kerberos tickets, and the like. A token may also be created using a standard language, such as the Security Assertion Markup Language (SAML). One example of token is a card in MICROSOFT CARDSPACE. Other examples include tokens compliant with OpenID, Lightweight Identity Protocol (LID), secure extensible identity protocol (SXIP), and the like.

In one embodiment, the identity manager 116 manages self-asserted identities 150. Each of the self-asserted identities includes one or more self-asserted claims. For example, a user may establish a self-asserted identity having a claim for his or her e-mail address. Notably, not all business models require the use of managed identities. Some relying parties may only desire to know that a user is a unique user, which may only require a user e-mail address or the like. For such relying parties, a user may identify his or her self using self-asserted identities having the required identification indicia, such as an e-mail address. In accordance with one aspect of the invention, a self-asserted identity includes information that indicates that other parties have accepted (and hence validated) the identity. If a given party considers these other parties trustworthy, the party may then choose to accept the self-asserted identity based solely on acceptance by the other parties. That is, a group of relying parties may establish "transitive trust" among one another such that a self-asserted claim by a user that is accepted by one of the parties is then accepted by all of the other parties in the group. Thus, once trust is established, the other parties avoid the expense of having to validate the self-asserted identity.

Figure 2:
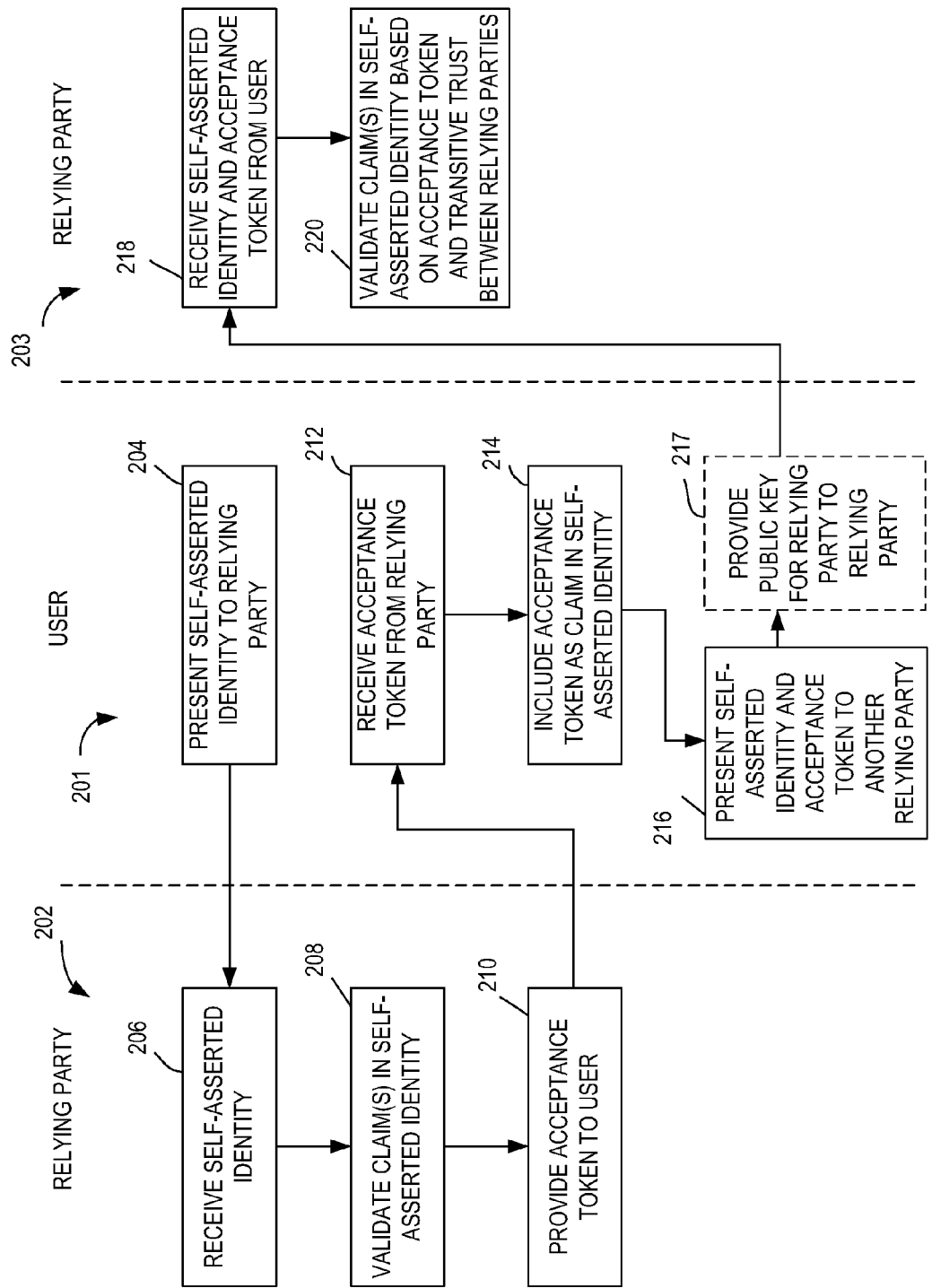
FIG. 2 is a flow diagram depicting an exemplary embodiment of a method for managing a self-asserted digital identity for a user in accordance with one or more aspects of the invention.

FIG. 2 is a flow diagram depicting an exemplary embodiment of a method 200 for managing a self-asserted digital identity for a user in accordance with one or more aspects of the invention. The method 200 includes a method 201 performed by the computer 104, a method 202 performed by a relying party 128, and a method 203 performed by a relying party 130. In the present embodiment, the user initially presents a self-asserted identity to the relying party 128, which validates one or more claims therein. The relying party 128 and the relying party 130 have established transitive trust between one another. When the user presents the self-asserted identity to the relying party 130, the relying party considers the identity to be valid based on the fact that the relying party 128 has accepted the identity as valid.

In particular, the method 201 begins at step 204, where a user of the computer 104 presents a self-asserted digital identity to the relying party 128. The user typically provides the self-asserted identity in response to a request by the relying party 128. The relying party 128 typically requests a digital identity of the user having a particular format and including a particular claim or claims. For example, the user may be establishing an account with the relying party 128 or may be attempting to access an already established account.

The method 202 then begins at step 206, where the relying party 128 receives the self-asserted digital identity. At step 208, the relying party 128 validates at least one claim in the self-asserted identity. The relying party 128 may perform such validation using any of various mechanisms well known in the art. At step 210, the relying party 128 provides an acceptance token to the user. The acceptance token includes information that purports authenticity of the self-asserted claim(s) according to the relying party 128 (i.e., the acceptance token shows that the relying party 128 has validated or otherwise trusts the claim(s) as being authentic). In one embodiment, the relying party 128 evidences this trust using a public key infrastructure (PKI) system. The relying party 128 digitally signs the self-asserted claims(s) or digitally signs a representation of such self-asserted claim(s) (e.g., a hash of the claim(s)). The digital signature may comprise an encryption of the claim(s) (or representation thereof) using an asymmetric encryption algorithm and a private key. Another party can verify that the relying party 128 has digitally signed the claim(s) using a public key of the relying party 128. Other parties can treat such a digital signature as evidence that the relying party 128 trusts the claim(s) as being authentic.

In one embodiment, the acceptance token includes other types of attributes associated with the relationship between the user and the relying party 128, such as information indicative of a time period over which authenticity of the self-asserted claim(s) has been maintained. For example, if the relying party 128 has verified the authenticity of a user's e-mail address, the relying party 128 may include how long the e-mail address has been part of the relationship with the user (e.g., this e-mail address has been used for X months/years).

Returning to the method 201, the acceptance token is received at step 212. At step 214, the acceptance token is included as a claim in the self-asserted identity. In one embodiment, the acceptance token is an optional claim. That is, when the user presents the self-asserted identity to a party, the acceptance token may be submitted selectively based on preference of the user. At step 216, the user presents the self-asserted identity and the acceptance token to the relying party 130. The user typically provides the self-asserted identity in response to a request by the relying party 130. The relying party 130 typically requests a digital identity of the user having a particular format and including a particular claim or claims. For example, the user may be establishing an account with the relying party 130 or may be attempting to access an already established account.

The method 203 then begins at step 218, where the relying party 130 receives the self-asserted identity and the acceptance token. At step 220, the relying party 130 validates the self-asserted claim(s) based on the acceptance token. That is, the relying party 130 uses the acceptance token as evidence that the relying party 128 has accepted the self-asserted claim(s) as being valid. If the relying party 130 considers the relying party 128 to be trustworthy, then the relying party 130 may validate the self-asserted claims(s) based solely on the token of acceptance. In other words, if the relying party 130 considers the relying party 128 to be trustworthy, then the self-asserted claim(s) are more reliable than other claims not backed by an acceptance token. Thus, the relying party 130 does not have to go through the expense of having to validate the self-asserted claims, as such claims have already been validated by another trustworthy party.

As described above, in one embodiment, the relying party 128 includes a digital signature in the token of acceptance. During validation at step 220, the relying party 130 may obtain the public key of the relying party 128 in order to authenticate the digital signature in the token of acceptance. Thus, the relying party 130 can be sure that the relying party 128 has accepted the self-asserted claim(s). In one embodiment, the relying party 130 can obtain the public key directly from the relying party 128 or from a list of public keys. Alternatively, the relying party 130 may obtain the public key for the relying party 128 from the user. That is, at optional step 217, the user provides a public key for the relying party 128 to the relying party 130. In any case, the public key obtained by the relying party 130 may be part of a digital certificate signed by a certificate authority. In this way, the relying party 130 knows the public key to be genuine.

Those skilled in the art will appreciate that although a single self-asserted identity has been described, the method 200 may be employed using multiple self-asserted identities, each having one or more self-asserted claims. Moreover, although only two relying parties are shown, the group of parties establishing transitive trust may include more than two parties.

In one embodiment, the identity manager 116 is configured to manage managed identities 152. Each of the managed identities includes one or more claims backed by an identity provider. For example, a managed identity may include the e-mail address of a user that has been validated by an identity provider. In accordance with one aspect of the invention, an identity provider issues a managed identity based on a self-asserted identity provided by the user, where the self-asserted identity includes information that indicates that other parties have accepted (and hence validated) the identity. If the identity provider considers these other parties trustworthy, the identity provider may then choose to issue the managed identity based solely on acceptance by the other parties.

Figure 3:
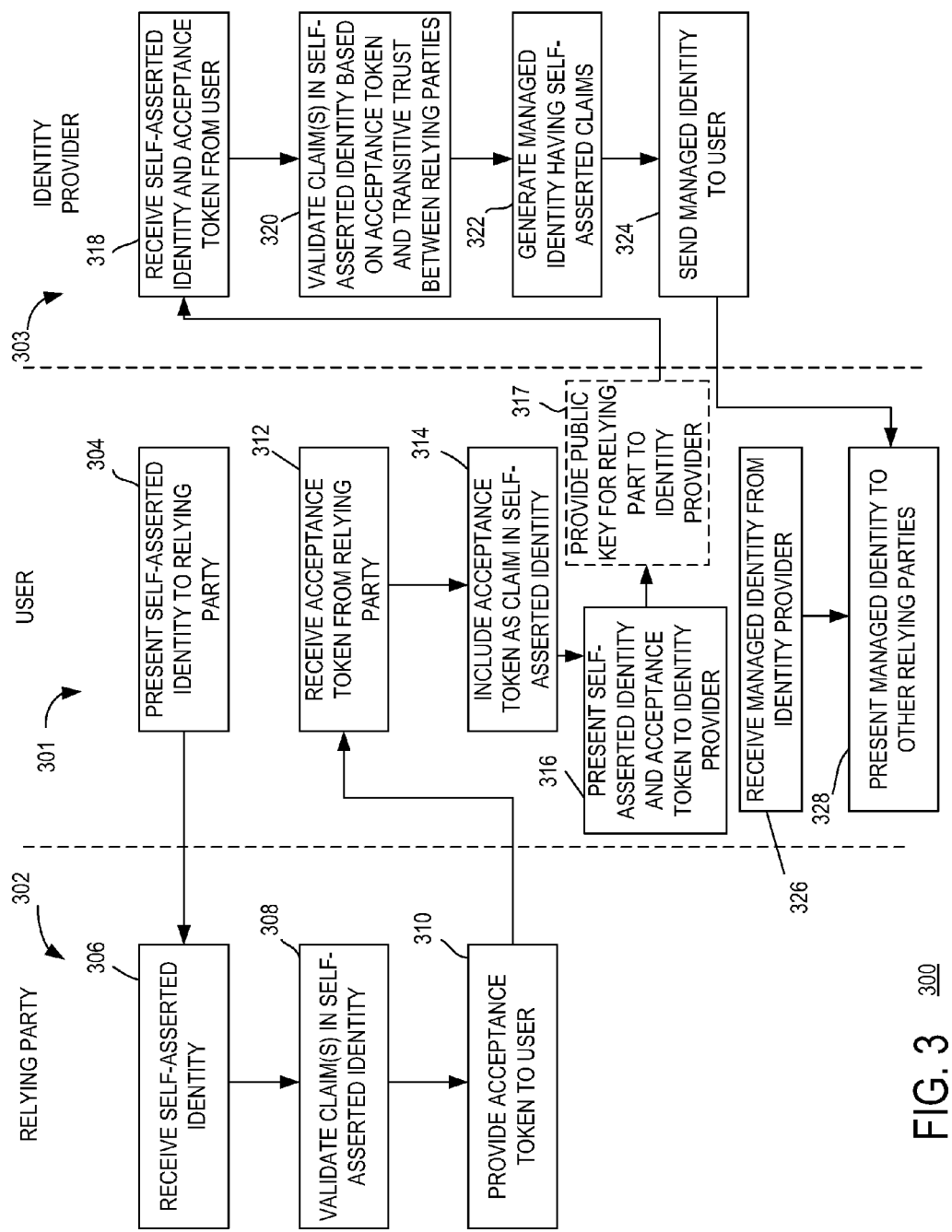
FIG. 3 is a flow diagram depicting another exemplary embodiment of a method for managing a self-asserted digital identity for a user in accordance with one or more aspects of the invention.

FIG. 3 is a flow diagram depicting another exemplary embodiment of a method 300 for managing a self-asserted digital identity for a user in accordance with one or more aspects of the invention. The method 300 includes a method 301 performed by the computer 104, a method 302 performed by the relying party 128, and a method 303 performed by an identity provider 132. In the present embodiment, the user initially presents a self-asserted identity to the relying party 128, which validates one or more claims therein. The relying party 128 and the identity provider 132 have established transitive trust between one another. The identity provider 132 issues two types of managed identities: One type of managed identity includes one or more claims that have been validated by the identity provider 132 itself. The other type of managed identity includes claim(s) that have been validated by one or more parties that the identity provider 132 trusts (e.g., the relying party 128). The second type of managed identity conveys the fact that other parties that the identity provider 132 trusts have validated the claim(s). The identity of these other parties is not included within the managed identity. The user can present this managed identity to other relying parties who have established trust with the identity provider 132.

In particular, the method 301 begins at step 304, where a user of the computer 104 presents a self-asserted digital identity to the relying party 128. The user typically provides the self-asserted identity in response to a request by the relying party 128. The relying party 128 typically requests a digital identity of the user having a particular format and including a particular claim or claims. For example, the user may be establishing an account with the relying party 128 or may be attempting to access an already established account.

The method 302 then begins at step 306, where the relying party 128 receives the self-asserted digital identity. At step 308, the relying party 128 validates at least one claim in the self-asserted identity. The relying party 128 may perform such validation using any of various mechanisms well known in the art. At step 310, the relying party 128 provides an acceptance token to the user. The acceptance token includes information that purports authenticity of the self-asserted claim(s) according to the relying party 128 (i.e., the acceptance token shows that the relying party 128 has validated or otherwise trusts the claim(s) as being authentic). In one embodiment, the relying party 128 evidences this trust using a public key infrastructure (PKI) system, as described above. That is, the acceptance token may include a digital signature of the relying party 128. In one embodiment, the acceptance token includes other types of attributes associated with the relationship between the user and the relying party 128, such as information indicative of a time period over which authenticity of the self-asserted claim(s) has been maintained.

Returning to the method 301, the acceptance token is received at step 312. At step 314, the acceptance token is included as a claim in the self-asserted identity. In one embodiment, the acceptance token is an optional claim. That is, when the user presents the self-asserted identity to a party, the acceptance token may be submitted selectively based on preference of the user. At step 316, the user presents the self-asserted identity and the acceptance token to the identity provider 132. The user may present the self-asserted identity to the identity provider 132 in order to obtain a managed identity.

The method 303 then begins at step 318, where the identity provider 132 receives the self-asserted identity and the acceptance token. At step 320, the identity provider 132 validates the self-asserted claim(s) based on the acceptance token. That is, the identity provider 132 uses the acceptance token as evidence that the relying party 128 has accepted the self-asserted claim(s) as being valid. If the identity provider 132 considers the relying party 128 to be trustworthy, then the identity provider 132 may validate the self-asserted claims(s) based solely on the token of acceptance.

As described above, in one embodiment, the relying party 128 includes a digital signature in the token of acceptance. During validation at step 320, the identity provider 132 may obtain the public key of the relying party 128 in order to authenticate the digital signature in the token of acceptance. Thus, the identity provider 132 can be sure that the relying party 128 has accepted the self-asserted claim(s). In one embodiment, the identity provider 132 can obtain the public key directly from the relying party 128 or from a list of public keys. Alternatively, the identity provider 132 may obtain the public key for the relying party 128 from the user. That is, at optional step 317, the user provides a public key for the relying party 128 to the identity provider 132. In any case, the public key obtained by the identity provider 132 may be part of a digital certificate signed by a certificate authority. In this way, the identity provider 132 knows the public key to be genuine.

At step 322, the identity provider 132 generates a managed identity having the self-asserted claim(s). The managed identity includes information indicating that the identity provider 132 has validated the claim(s) therein based on transitive trust with one or more relying parties. The identity provider 132 then digitally signs the managed identity so that other parties can verify that the managed identity has originated from the identity provider 132. At step 324, the identity provider 132 sends the managed identity to the user. Returning to the method 301, at step 326, the user receives the managed identity from the identity provider 132. At step 328, the user presents the managed identity to one or more relying parties.

Those skilled in the art will appreciate that although a single self-asserted identity and corresponding managed identity have been described, the method 300 may be employed using multiple self-asserted identities, each having one or more self-asserted claims, and each giving rise to a respective managed identity.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

What is claimed is:

1. A method of managing a digital identity of a user, comprising:
   providing the digital identity from a computer to a relying party, the digital identity having a self-asserted claim, wherein the user functions as a first identity provider for the digital identity;
   obtaining an acceptance token from the relying party, the acceptance token purporting authenticity of the self-asserted claim according to the relying party and comprising a representation of the self-asserted claim digitally signed by the relying party using a private key of the relying party;
   providing the digital identity and the acceptance token to a second party to request validation of the self-asserted claim by the second party based on the acceptance token, wherein the second party relies on the acceptance token to indicate authenticity of the self-asserted claim as verified by the relying party;
   providing, as part of a digital certificate digitally signed by a certificate authority, a public key of the relying party to the second party for use in verifying the acceptance token as digitally signed by the relying party; and
   receiving a managed digital identity from a second identity provider, the managed digital identity including a claim corresponding to the self-asserted claim, the managed identity purporting authenticity of the claim according to the second identity provider;
   wherein the managed digital identity comprises one or more of a managed digital identity having one or more claims that have been validated by the second identity provider and a managed digital identity having one or more claims that have been validated by one or more relying parties that the second identity provider trusts.

2. The method of claim 1, further comprising:
   augmenting the digital identity to include the acceptance token as an optional claim therein.

3. The method of claim 1, wherein the acceptance token includes information indicative of a time period over which authenticity of the self-asserted claim has been maintained by the relying party.

4. The method of claim 1, wherein the second party is the second identity provider.

5. The method of claim 1, wherein the identity of the relying party is not included in the managed digital identity.

6. A system for managing a digital identity of a user comprising:
   one or more processors communicatively coupled to a network; wherein the one or more processors are configured to:
   provide the digital identity to a relying party, the digital identity having a self-asserted claim wherein the user functions as a first identity provider for the digital identity;
   obtain an acceptance token from the relying party, the acceptance token purporting authenticity of the self-asserted claim according to the relying party and comprising a representation of the self-asserted claim digitally signed by the relying party using a private key of the relying party; and
   provide the digital identity and the acceptance token to a second party to request validation of the self-asserted claim by the second party based on the acceptance token wherein the second party relies on the acceptance token to indicate authenticity of the self-asserted claim as verified by the relying party;
   provide, as part of a digital certificate digitally signed by a certificate authority, a public key of the relying party to the second party for use in verifying the acceptance token as digitally signed by the relying party; and
   receive a managed digital identity from a second identity provider, the managed digital identity including a claim corresponding to the self-asserted claim, the managed identity purporting authenticity of the claim according to the second identity provider;
   wherein the managed digital identity comprises one or more of a managed digital identity having one or more claims that have been validated by the second identity provider and a managed digital identity having one or more claims that have been validated by one or more relying parties that the second identity provider trusts.

7. The system of claim 6, wherein the one or more processors are further configured to:
   augment the digital identity to include the acceptance token as an optional claim therein.

8. The system of claim 6, wherein the acceptance token includes information indicative of a time period over which authenticity of the self-asserted claim has been maintained by the relying party.

9. The system of claim 6, wherein the second party is the second identity provider.

10. The system of claim 6, wherein the identity of the relying party is not included in the managed digital identity.

11. A method of managing a digital identity of a user, comprising:
- providing the digital identity from a computer to a relying party, the digital identity having a self-asserted claim, wherein the user functions as a first identity provider for the digital identity;
- validating the self-asserted claim at the relying party;
- sending an acceptance token from the relying party to the computer, the acceptance token purporting authenticity of the self-asserted claim according to the relying party and comprising a representation of the self-asserted claim digitally signed by the relying party using a private key of the relying party;
- providing the digital identity and the acceptance token from the computer to a second party;
- providing, as part of a digital certificate digitally signed by a certificate authority, a public key of the relying party to the second party for use in verifying the acceptance token as digitally signed by the relying party; and
- validating the self-asserted claim at the second party based on the acceptance token and a transitive trust established between the relying party and the second party, wherein the second party relies on the acceptance token to indicate authenticity of the self-asserted claim as verified by the relying party; and
- sending a managed digital identity from a second identity provider to the computer, the managed digital identity including a claim corresponding to the self-asserted claim, the managed digital identity purporting authenticity of the claim according to the second identity provider;
- wherein the managed digital identity comprises one or more of a managed digital identity having one or more claims that have been validated by the second identity provider and a managed digital identity having one or more claims that have been validated by one or more relying parties that the second identity provider trusts.

12. The method of claim 11, further comprising:
augmenting the digital identity to include the acceptance token as an optional claim therein.

13. The method of claim 11, wherein the acceptance token includes information indicative of a time period over which authenticity of the self-asserted claim has been maintained by the relying party.

14. The method of claim 11, wherein the second party is the second identity provider.

15. The method of claim 11, wherein the identity of the relying party is not included in the managed digital identity.

* * * * *